Aug. 12, 1930.                K. E. PEILER                1,772,584
ROLLER CONVEYER
Filed April 24, 1928

Witness:
Winslow B. Thayer

Inventor:
Karl E. Peiler
by Roberts & Binion
Attorneys.

Patented Aug. 12, 1930

1,772,584

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

ROLLER CONVEYER

Application filed April 24, 1928. Serial No. 272,376.

This invention relates to conveying apparatus, and more particularly to such apparatus as is commonly used for conveying bottles or other glassware to a lehr. One type of conveyer used for that purpose consists of a plurality of positively driven rollers which support the ware and advance it toward the lehr. When a conveyer of this kind is used to carry ware to a lehr having a flexible belt conveyer, difficulty is encountered in getting the ware from the roller conveyer onto the belt conveyer, due to the fact that the belt conveyer, at the point where the ware is received, passes around a roller of several inches in diameter, and it is impossible to get a roller of the size used in the conveyer (⅝ or ¾ of an inch diameter) close enough to the horizontal receiving portion of the wire conveyer to avoid tipping over the bottle. In other words, the bottle tips over and tends to fall down the crack between the last roller of the roller conveyer and the belt conveyer.

The object of this invention is to overcome this difficulty, and this is accomplished by the provision of a small diameter roller between the last standard size roller of the roller conveyer and the belt conveyer. In order to get this roller as close as possible to the horizontal stretch of the conveyer, this diameter is made as small as possible, and this makes it so small that it is liable to bend under the weight of the ware. A further object of the invention is to provide means to prevent this bending or deformation of the roller.

In order to more clearly explain my invention, reference is made to the accompanying drawings, in which.

Figure 1:
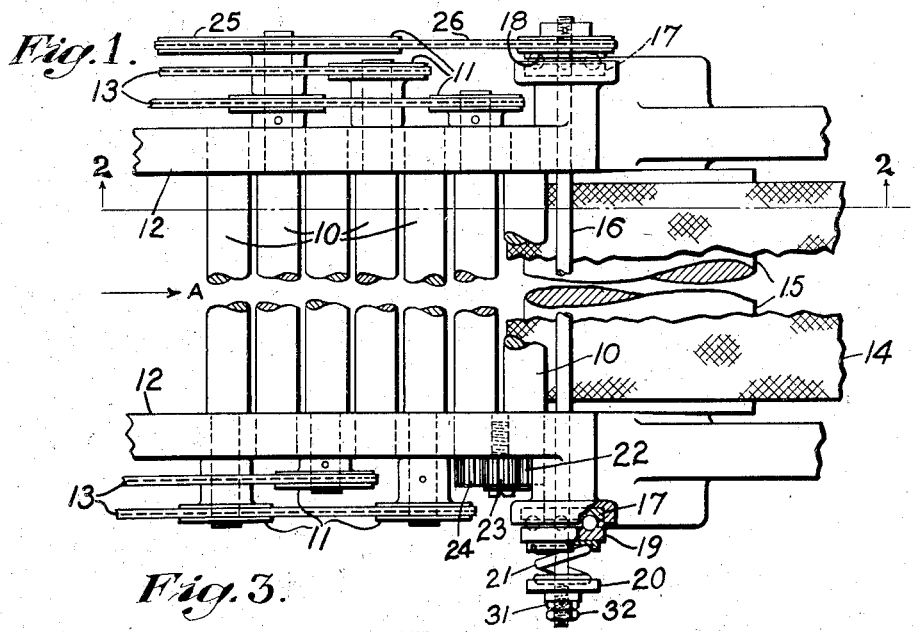
Figure 1 is a broken plan view of a roller conveyer arranged to feed ware to a belt conveyer and showing my invention applied thereto.

In the drawings, 10 represents the rollers of a roller conveyer driven by sprocket wheels 11 mounted thereon. These sprocket wheels are on alternate ends of the rollers in order to provide clearance for the sprocket wheels, and also on the same ends of the rollers the sprockets are spaced different distances from a frame 12 to give still further clearance. The rollers are journaled in the frame 12 and the sprocket wheels are driven by sprocket chains 13. These rollers turn in the direction shown by the arrows in Fig. 2 and advance the ware in the direction of the arrow A toward a belt conveyer 14 which passes around a roller of relatively large diameter, as shown at 15. The roller 15 rotates in the direction indicated by the arrow. A belt conveyer of this type, as used with a lehr, is described in U. S. Patent No. 1,583,-046, granted May 4, 1926, to the Hartford-Empire Company as assignee of Henry N. Ingle. By referring to Fig. 2, it will be seen that no matter how close the last roller of the roller conveyer is placed to the roller 15, there is still left a wide space between the two in which the bottles or other ware are without support and therefore liable to tip over. To prevent this, in this space is placed an auxiliary or intermediate roller 16 of much smaller diameter.

Figures 2, 4:
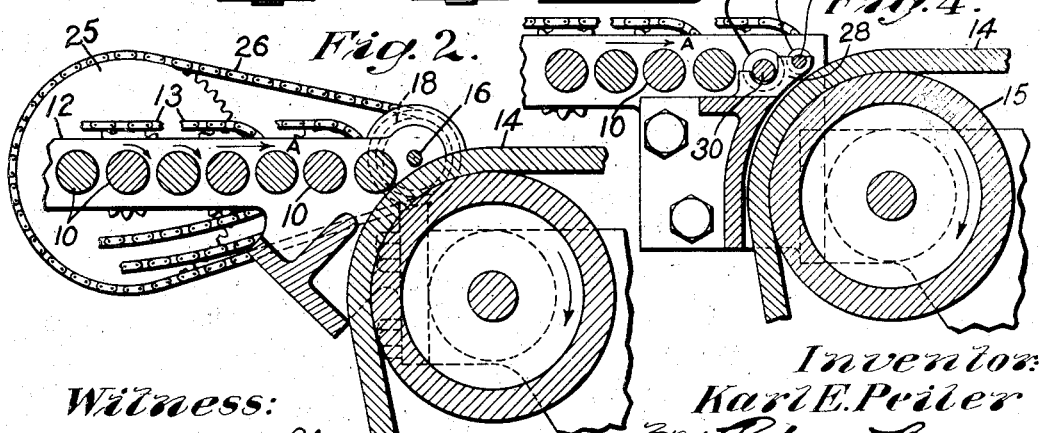
Fig. 2 is a sectional elevation taken on the line 2—2 of Fig. 1.
Fig. 4 is a sectional elevation taken on the line 4—4 of Fig. 3.

Because of its small diameter, the roller 16 is not very stiff and is liable to be bent under the weight of the bottles. One way of overcoming this tendency is shown in Figs. 1 and 2, which consists of putting the roller 16 under longitudinal tension and at the same time arranging it so that it can rotate freely and be driven at the same peripheral speed as the rollers 10. At each side of the frame 12 is provided an enlarged support for a thrust bearing 17. At one end of the roller 16 is rigidly attached a bearing collar 18 which, as shown, is also provided at its outer periphery with a sprocket wheel for driving roller 16. Cooperating with the other bearing 17 is a collar 19 adapted to rotate with the roller 16, but free to slide longitudinally thereon. In order to reduce the friction at 17—18 and 17—19 to a minimum, I have provided ball bearings as shown. Adjustably fixed to the roller 16 is a collar 20 and between collar 19 and collar 20 is a compression spring 21. By means of nut 31 and locknut 32 the degree of compression of spring 21 may be readily adjusted. Because of the extra space required by the support 17, the sprocket wheel on the last roller 10 is omitted, and there is used a gear 22 fixed to the last roller 10 and driven through a pinion 23 from gear 24 on the next preceding roller. To drive the roller 16 at the same peripheral speed as the rollers 10, there is provided the large sprocket wheel 25 on one of the rollers 10 and the sprocket chain 26 which passes around sprocket wheel 18.

In operation, the bottles or other ware passing along the rollers 10 will, in passing to the belt conveyer 14, rest on the roller 16 and be prevented from tipping into the space which would exist at this point in the absence of the roller 16. As roller 16 is positively driven at the same peripheral speed as roller 10, there will be no tendency for the bottles to remain at this point and not move forward. The spring 21 exerts a tension on the roller 16 which prevents it from sagging, even though it is of small diameter and relatively flexible.

Figure 3:
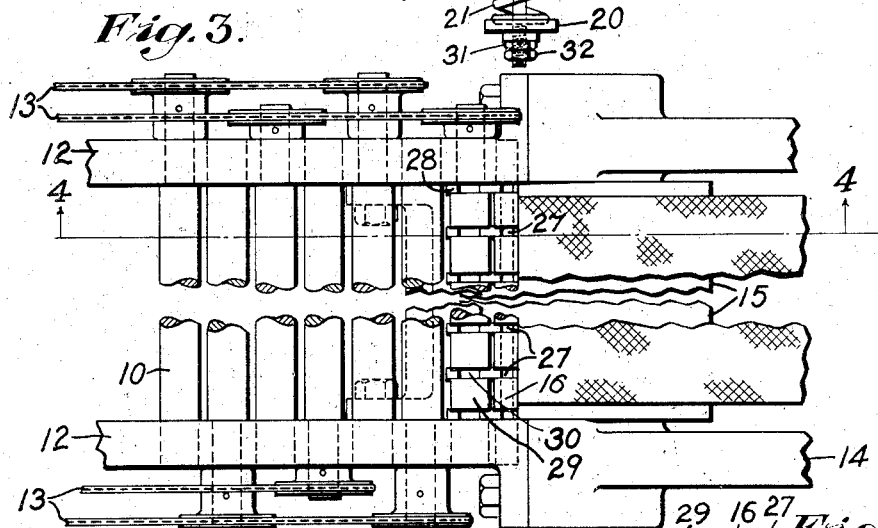
Fig. 3 is a broken plan view similar to Fig. 1 of a modified form of the invention.

In Figs. 3 and 4 is shown another means for preventing sagging of the small roller 16. In this modification, the roller 16 is not positively driven and is provided with a plurality of journal portions 27 of reduced diameter which rest in the bearing member 28. These journal portions may be formed by turning down portions in the roller, or collars may be passed over a rod of small diameter. In order to provide sufficient strength in the bearing member 28, the adjacent large roller 29 is grooved, as shown at 30, and the bearing member 28 may also support the roller 29 in the grooves 30 in a manner similar to that in which the roller 16 is supported.

With this construction, the positively driven rollers will push the ware onto the small roller 16 which will turn through frictional engagement with the advancing ware, transferring it onto the belt conveyer 14.

It is obvious that various modifications may be made in carrying out the invention as described above, all of which it is intended to include as within the spirit of the inventon as defined in the appended claims.

I claim as my invention:

1. Conveying apparatus comprising a plurality of positively driven rollers, a belt conveyer, said belt conveyer passing around a roller of relatively large diameter adjacent to said driven rollers, an auxiliary roller of relatively small diameter between said driven rollers and said large roller, and means for maintaining said auxiliary roller under longitudinal tension.

2. Conveying apparatus comprising a plurality of positively driven rollers, a belt conveyer, said belt conveyer passing around a roller of relatively large diameter adjacent to said driven rollers, an auxiliary roller of relatively small diameter between said driven rollers and said large roller, means for driving said auxiliary roller at the same peripheral speed as said driven rollers, and means for maintaining said auxiliary roller under longitudinal tension.

3. For conveying apparatus having a roller conveyer delivering to a belt conveyer which passes around a roller of relatively large diameter adjacent the roller conveyer, an auxiliary roller of relatively small diameter between said roller conveyer and said large roller, a supporting frame in which said auxiliary roller is journaled, thrust bearing collars on each end of said auxiliary roller, and a bearing on the supporting frame for each collar pressing outwardly against said collar.

4. For conveying apparatus having a roller conveyer delivering to a belt conveyer which passes around a roller of relatively large diameter adjacent the roller conveyer, an auxiliary roller of relatively small diameter between said roller conveyer and said large roller, a supporting frame in which said auxiliary roller is journaled, thrust bearing collars on each end of said auxiliary roller, a bearing on the supporting frame for each collar pressing outwardly against said collar, and resilient means for maintaining said pressure.

Signed at Hartford, Conn., this 21st day of April, 1928.

KARL E. PEILER.